US009378619B2

(12) United States Patent
Hoffman et al.

(10) Patent No.: US 9,378,619 B2
(45) **Date of Patent: *Jun. 28, 2016**

(54) GAMING SYSTEM, GAMING DEVICE AND METHOD FOR NORMALIZING DIFFERENT FEATURES OF AN ON-DEMAND BONUS GAME

(71) Applicant: IGT, Las Vegas, NV (US)

(72) Inventors: Benjamin C. Hoffman, Reno, NV (US); Christmas C. Parker, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,546

(22) Filed: Jul. 2, 2015

(65) Prior Publication Data

US 2015/0302697 A1 Oct. 22, 2015

Related U.S. Application Data

(63) Continuation of application No. 14/272,059, filed on May 7, 2014, now Pat. No. 9,076,296, which is a continuation of application No. 13/032,801, filed on Feb. 23, 2011, now Pat. No. 8,727,872.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ........ *G07F 17/3255* (2013.01); *G07F 17/3225* (2013.01); *G07F 17/3244* (2013.01); *G07F 17/34* (2013.01)

(58) Field of Classification Search
USPC ....................... 463/20, 22, 23, 25, 27, 30, 39
See application file for complete search history.

(56) References Cited

U.S. PATENT DOCUMENTS

| | | | |
|---|---|---|---|
| 6,886,584 | B2 | 5/2005 | Turvey |
| 6,988,946 | B2 | 1/2006 | Michaelson et al. |

(Continued)

FOREIGN PATENT DOCUMENTS

| | | |
|---|---|---|
| EP | 2 056 266 | 5/2009 |
| WO | WO 2005/025695 | 3/2005 |

OTHER PUBLICATIONS

European Search Report for European Patent Application No. EP 11 18 1438 dated May 9, 2012.

(Continued)

*Primary Examiner* — Adetokunbo O Torimiro
(74) *Attorney, Agent, or Firm* — Neal, Gerber & Eisenberg LLP

(57) ABSTRACT

In various embodiments, the gaming system, gaming device, and gaming method disclosed herein provides a bonus game which enables players to combine different, independent features without introducing any significant advantage or significant disadvantage to players for combining certain features over other features. The gaming system utilizes one or more bonus game supplemental awards to insure that the average expected payout per selected feature remains the same or substantially the same regardless of which bonus game features or combinations of features are employed for a play of a bonus game.

19 Claims, 13 Drawing Sheets

(56) References Cited

U.S. PATENT DOCUMENTS

| | | | |
|---|---|---|---|
| 7,223,172 | B2 | 5/2007 | Baerlocher et al. |
| 7,291,069 | B2 | 11/2007 | Michaelson et al. |
| 7,329,183 | B2 | 2/2008 | Michaelson et al. |
| 7,399,227 | B2 | 7/2008 | Michaelson et al. |
| 7,470,183 | B2 | 12/2008 | Wishart |
| 7,503,849 | B2 | 3/2009 | Hornik et al. |
| 7,563,163 | B2 | 7/2009 | Crumby |
| 7,629,703 | B2 | 12/2009 | Storbekk |
| 7,654,897 | B2 | 2/2010 | Devaull et al. |
| 7,785,189 | B2 | 8/2010 | Brosnan et al. |
| 7,789,755 | B2 | 9/2010 | Davis et al. |
| 7,811,168 | B2 | 10/2010 | Parham et al. |
| 7,862,430 | B2 | 1/2011 | Baerlocher et al. |
| 7,985,133 | B2 | 7/2011 | Baerlocher et al. |
| 8,002,620 | B2 | 8/2011 | Nicely et al. |
| 8,092,299 | B2 | 1/2012 | Cohen et al. |
| 8,147,320 | B2 | 4/2012 | Englman et al. |
| 2002/0142846 | A1 | 10/2002 | Paulsen |
| 2003/0040355 | A1 | 2/2003 | Baerlocher |
| 2004/0005919 | A1 | 1/2004 | Walker et al. |
| 2004/0043815 | A1 | 3/2004 | Kaminkow |
| 2008/0076534 | A1 | 3/2008 | Iddings et al. |
| 2008/0108423 | A1 | 5/2008 | Benbrahim et al. |
| 2008/0113770 | A1 | 5/2008 | Gelber et al. |
| 2008/0153564 | A1 | 6/2008 | Baerlocher et al. |
| 2008/0182650 | A1 | 7/2008 | Randall et al. |
| 2008/0248867 | A1 | 10/2008 | Englman et al. |
| 2009/0291736 | A1 | 11/2009 | Walker et al. |
| 2009/0305776 | A1 | 12/2009 | Englman et al. |
| 2010/0048283 | A1 | 2/2010 | Anderson et al. |
| 2010/0062841 | A1 | 3/2010 | Englman et al. |
| 2010/0075746 | A1 | 3/2010 | Anderson et al. |
| 2010/0081497 | A1 | 4/2010 | Wolf et al. |
| 2010/0113122 | A1 | 5/2010 | Walker et al. |
| 2010/0120498 | A1 | 5/2010 | Cuddy et al. |
| 2010/0120499 | A1 | 5/2010 | Cohen |
| 2010/0120503 | A1 | 5/2010 | Hoffman et al. |
| 2010/0120525 | A1 | 5/2010 | Baerlocher et al. |
| 2010/0124971 | A1 | 5/2010 | Baerlocher et al. |
| 2010/0124973 | A1 | 5/2010 | DeWaal et al. |
| 2010/0137056 | A1 | 6/2010 | Hoffman et al. |
| 2010/0210344 | A1 | 8/2010 | Edidin et al. |
| 2011/0003627 | A1 | 1/2011 | Nicely et al. |
| 2011/0045892 | A1 | 2/2011 | Vann et al. |
| 2011/0105216 | A1 | 5/2011 | Cohen et al. |
| 2011/0111826 | A1 | 5/2011 | Baerlocher et al. |
| 2011/0117989 | A1 | 5/2011 | Kennedy et al. |
| 2011/0118010 | A1 | 5/2011 | Brune |
| 2011/0124402 | A1 | 5/2011 | DeWaal et al. |
| 2011/0201403 | A1 | 8/2011 | Jaffe et al. |
| 2011/0201416 | A1 | 8/2011 | Jaffe |
| 2011/0263312 | A1 | 10/2011 | DeWaal et al. |

OTHER PUBLICATIONS

Austrian Patent Office Search Report and Written Opinion for Singapore Patent Application No. 201106542-2 dated Jun. 22, 2012.

FIG. 4

FIG. 4A
FIG. 4B

FIG. 4A

| Scenario of Features Selected | Feature #1 | Feature #2 | Feature #3 | Feature #4 | Feature #5 | Feature #6 | Number of Bonus Game Feature Units Redeemed | Average Expected Payout for Play of Bonus Game | Average Expected Bonus Game Supplemental Award Value | Weighting of Top Bonus Game Supplemental Award Value |
|---|---|---|---|---|---|---|---|---|---|---|
| 1 | 0 | 0 | 0 | 0 | 0 | 0 | 0 | 0 | 0 | 0 |
| 2 | 0 | 0 | 0 | 0 | 0 | 1 | 1 | 120.00 | 105 | 3600 |
| 3 | 0 | 0 | 0 | 0 | 1 | 0 | 1 | 115.00 | 110.0222 | 3826 |
| 4 | 0 | 0 | 0 | 0 | 1 | 1 | 2 | 224.50 | 225.5111 | 9023 |
| 5 | 0 | 0 | 0 | 1 | 0 | 0 | 1 | 118.00 | 107 | 3690 |
| 6 | 0 | 0 | 0 | 1 | 0 | 1 | 2 | 306.50 | 143.5111 | 5333 |
| 7 | 0 | 0 | 0 | 1 | 1 | 0 | 2 | 296.00 | 154 | 5805 |
| 8 | 0 | 0 | 0 | 1 | 1 | 1 | 3 | 554.00 | 121 | 4320 |
| 9 | 0 | 0 | 1 | 0 | 0 | 0 | 1 | 140.50 | 84.51111 | 2678 |
| 10 | 0 | 0 | 1 | 0 | 0 | 1 | 2 | 287.50 | 162.5111 | 6188 |
| 11 | 0 | 0 | 1 | 0 | 1 | 0 | 2 | 287.00 | 163 | 6210 |
| 12 | 0 | 0 | 1 | 0 | 1 | 1 | 3 | 462.00 | 213 | 8460 |
| 13 | 0 | 0 | 1 | 1 | 0 | 0 | 2 | 334.00 | 116 | 4095 |
| 14 | 0 | 0 | 1 | 1 | 0 | 1 | 3 | 647.00 | 28 | 135 |
| 15 | 0 | 0 | 1 | 1 | 1 | 0 | 3 | 333.50 | 341.5111 | 14243 |
| 16 | 0 | 1 | 0 | 0 | 0 | 0 | 1 | 135.50 | 89.51111 | 2903 |
| 17 | 0 | 1 | 0 | 0 | 0 | 1 | 2 | 211.50 | 238.5111 | 9608 |

FIG. 4B

| | | | | | | | | | | |
|---|---|---|---|---|---|---|---|---|---|---|
| 18 | 0 | 1 | 0 | 0 | 1 | 0 | 2 | 206.50 | 243.5111 | 9833 |
| 19 | 0 | 1 | 0 | 0 | 1 | 1 | 3 | 316.50 | 358.5111 | 15008 |
| 20 | 0 | 1 | 0 | 1 | 0 | 0 | 2 | 210.00 | 240 | 9675 |
| 21 | 0 | 1 | 0 | 1 | 0 | 1 | 3 | 398.50 | 276.5111 | 11318 |
| 22 | 0 | 1 | 0 | 1 | 1 | 0 | 3 | 388.00 | 287 | 11790 |
| 23 | 0 | 1 | 1 | 0 | 0 | 0 | 2 | 232.00 | 218.0222 | 8686 |
| 24 | 0 | 1 | 1 | 0 | 0 | 1 | 3 | 378.50 | 296.5111 | 12218 |
| 25 | 0 | 1 | 1 | 0 | 1 | 0 | 3 | 378.50 | 296.5111 | 12218 |
| 26 | 0 | 1 | 1 | 1 | 0 | 0 | 3 | 426.00 | 249 | 10080 |
| 27 | 1 | 0 | 0 | 0 | 0 | 0 | 1 | 138.00 | 87 | 2790 |
| 28 | 1 | 0 | 0 | 0 | 0 | 1 | 2 | 242.50 | 207.5111 | 8213 |
| 29 | 1 | 0 | 0 | 0 | 1 | 0 | 2 | 220.50 | 229.5111 | 9203 |
| 30 | 1 | 0 | 0 | 0 | 1 | 1 | 3 | 358.50 | 316.5111 | 13118 |
| 31 | 1 | 0 | 0 | 1 | 0 | 0 | 2 | 312.00 | 138 | 5085 |
| 32 | 1 | 0 | 0 | 1 | 0 | 1 | 3 | 546.50 | 128.5111 | 4658 |
| 33 | 1 | 0 | 0 | 1 | 1 | 0 | 3 | 504.50 | 170.5111 | 6548 |
| 34 | 1 | 0 | 1 | 0 | 0 | 0 | 2 | 297.50 | 152.5111 | 5738 |
| 35 | 1 | 0 | 1 | 0 | 0 | 1 | 3 | 479.50 | 195.5111 | 7673 |
| 36 | 1 | 0 | 1 | 0 | 1 | 0 | 3 | 456.00 | 219.0222 | 8731 |
| 37 | 1 | 0 | 1 | 1 | 0 | 0 | 3 | 632.00 | 43 | 810 |
| 38 | 1 | 1 | 0 | 0 | 0 | 0 | 2 | 279.00 | 171 | 6570 |
| 39 | 1 | 1 | 0 | 0 | 0 | 1 | 3 | 383.00 | 292 | 12015 |
| 40 | 1 | 1 | 0 | 0 | 1 | 0 | 3 | 361.50 | 313.5111 | 12983 |
| 41 | 1 | 1 | 0 | 1 | 0 | 0 | 3 | 453.50 | 221.5111 | 8843 |
| 42 | 1 | 1 | 1 | 0 | 0 | 0 | 3 | 439.00 | 236.0222 | 9496 |

FIG. 5

Bonus Game
Supplemental
Award Value Table:

| Value | Weight |
| --- | --- |
| 5 | 10000 |
| 10 | 10000 |
| 15 | 10000 |
| 20 | 10000 |
| 25 | 10000 |
| 30 | 10000 |
| 35 | 10000 |
| 40 | 10000 |
| 45 | 10000 |
| 2000 | See FIG. 4 |

GAMING SYSTEM, GAMING DEVICE AND METHOD FOR NORMALIZING DIFFERENT FEATURES OF AN ON-DEMAND BONUS GAME

PRIORITY CLAIM

This application is a continuation of, claims priority to and the benefit of U.S. patent application Ser. No. 14/272,059, filed on May 7, 2014, which is a continuation of, claims priority to and the benefit of U.S. patent application Ser. No. 13/032,801, filed on Feb. 23, 2011, now U.S. Pat. No. 8,727,872, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming devices which provide players awards in primary or base games are well known. Gaming devices generally require the player to place or make a wager to activate the primary or base game. In many of these gaming devices, the award is based on the player obtaining a winning symbol or symbol combination and on the amount of the wager (e.g., the higher the wager, the higher the award). Symbols or symbol combinations which are less likely to occur usually provide higher awards.

In such known gaming devices, the amount of the wager made on the primary game by the player may vary. For instance, the gaming device may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming device, such as a slot game, may enable players to make wagers of substantially different amounts on each play of the primary or base game ranging, for example, from 1 credit up to 125 credits (e.g., 5 credits on each of 25 separate paylines). Accordingly, it should be appreciated that different players play at substantially different wagering amounts or levels and at substantially different rates of play.

Secondary or bonus games are also known in gaming devices. The secondary or bonus games usually provide an additional award to the player. Secondary or bonus games usually do not require an additional wager by the player to be activated. Certain secondary or bonus games are activated or hit upon an occurrence of a designated triggering symbol or triggering symbol combination in the primary or base game. For instance, a bonus symbol occurring on the payline on the third reel of a three reel slot machine may hit the secondary or bonus game. Part of the enjoyment and excitement of playing certain gaming devices is the occurrence or triggering of the secondary or bonus game (even before the player knows how much the bonus award will be).

Secondary or bonus games which enable a player to combine multiple independent features for the same play of the secondary or bonus game increase player excitement and enjoyment. For example, a gaming device may enable a player to select a first feature of applying a multiplier to any award of that play of the bonus game and also select a second different feature of causing one or more symbols to function as wild symbols for that same play of the bonus game. Enabling a player to select which features to employ for a play of a bonus game (and to combine different features) provides the player a sense of control over the play of the bonus game and thus increases player excitement and enjoyment.

However, combining different features for the same play of a bonus game often non-linearly increases the average expected payout of the bonus game (i.e., the average expected payout of the bonus game is increased more than an increase to the average expected payout of adding the two individual features together). For example, a gaming device with a bonus game that employs the independent features of applying a multiplier to any award and also causing one or more symbols to function as wild symbols non-linearly increases the average expected payout for that play of the bonus game because the increased wild symbols result in an increased probability of winning an award which is then modified by the multiplier. In this example, one employed feature affects another employed feature to cause a non-linear increase to the average expected payout for that play of the bonus game. Such a configuration thus introduces a level of strategy into the bonus game because certain strategic or knowledgeable players will combine independent features which result in a play of a bonus game with a first average expected payout while certain less strategic or less knowledgeable players will combine independent features which result in a play of a bonus game with a second, lower average expected payout. Such a configuration thus reduces the level of excitement and enjoyment for less strategic or less knowledgeable players.

Accordingly, there is a continuing need to provide new and different gaming devices and gaming systems as well as new and different ways to provide bonus awards to players without requiring strategy to maximize the bonus game average expected payout.

SUMMARY

In various embodiments, the gaming system, gaming device, and gaming method disclosed herein provides an on-demand bonus game which enables players to combine different, independent features without introducing any significant advantage or disadvantage to players for combining certain features over other features. The gaming system utilizes one or more bonus game supplemental awards to insure that the average expected payout per selected bonus game feature remains the same or substantially the same regardless of which bonus game features or combinations of features are employed for a play of a bonus game. In other words, to account for different combinations of features non-linearly increasing the average expected payout of a bonus game, the gaming system disclosed herein employs bonus game supplemental awards of different average expected values to provide an on-demand bonus game which enables players to combine different, independent features while insuring that the bonus game average expected payout (per feature employed) remains the same or substantially the same.

More specifically, the gaming system of one embodiment disclosed herein maintains a normalization table or database of all possible features and combinations of features which can be selected for a play of a bonus game. The normalization table or database includes, for each different individual feature and each different combination of features: (i) an average expected payout or average expected bonus game award value for a play of a bonus game employing that feature (or that combination of features); and (ii) an average expected bonus game supplemental award value for a play of a bonus game employing that feature (or that combination of features). In this embodiment, the gaming system determines the average expected bonus game supplemental award value for each different individual feature (or each different combination of features) based on the average expected payout for a play of a bonus game employing that feature (or that combination of features) and a target average expected payout per employed feature. Such a configuration provides that each play of the bonus game employing a first quantity of features (regardless of which specific feature(s) are employed) will each have substantially the same first total average expected payout. Such a configuration further provides that each play of the bonus game employing a second, different quantity of features (regardless of which specific feature(s) are employed) will each have substantially the same second, different total average expected payout.

In one example, the gaming system employs a target average expected payout per feature of two-hundred-fifty credits (i.e., each time the player selects to employ a feature, regardless of which feature is selected, the gaming system expects to, on average, payout two-hundred-fifty credits). In this example, as seen in Table 1 below:

(i) a first feature ("Feature A") includes transforming at least one winning symbol combination with at least one minor symbol to a winning symbol combination with at least one major symbol (and thus increasing the payout for certain winning symbol combinations) and this first feature is associated with an average expected value or average expected payout of thirty-five credits;

(ii) a second feature ("Feature B") includes providing a certain number of credits for each winning symbol combination which includes at least one major symbol and this second feature is associated with an average expected value or average expected payout of thirty credits; and (iii) a third feature ("Feature C") includes adding wild symbols to random positions of the reels (to increase the probability of each winning symbol combination be generated) and this third feature is associated with an average expected value or average expected payout of fifty-five credits.

TABLE 1

| Feature/ Feature Combination | Description of Feature | Average Expected Payout per Feature Employed | Average Expected Bonus Game Supplemental Award Value per Feature Employed | Total Average Expected Bonus Game Payout per Feature Employed |
|---|---|---|---|---|
| A | Minor Upgrade | 35 | 215 | 250 |
| B | Major Credits | 30 | 220 | 250 |
| C | Extra Wilds | 55 | 195 | 250 |
| A + C | Minor Upgrade w/Extra Wilds | 100 | 150 | 250 |
| B + C | Major Credits w/Extra Wilds | 75 | 175 | 250 |
| A + B + C | Minor Upgrade w/Major Credits and Extra Wilds | 200 | 50 | 250 |

In this example, as seen in Table 1 above, combining Feature A and Feature C results in a non-linearly higher average expected value or average expected payout (per bonus game feature employed) because the awarding of extra wilds of Feature C causes an increased probability of generating the winning symbol combinations with at least one minor symbol of Feature A, thus causing Feature A to be more rewarding when combined with Feature C. In other words, while:

(i) employing Feature A individually is expected to increase the average payout for a play of a bonus game employing only Feature A by thirty-five credits, and (ii) employing Feature C individually is expected to increase the average payout for a play of a bonus game employing only Feature C by fifty-five credits, (iii) when Feature A and Feature C are combined for a single play of a bonus game:

(A) rather than linearly increasing the average payout of a play of a bonus game employing Feature A and Feature C by ninety credits (i.e., the sum of the average expected payout of thirty-five credits for a play of a bonus game employing only Feature A and the average expected payout of fifty-five credits for a play of a bonus game employing only Feature C), (B) because Feature A and Feature C interact as described above, the average expected payout for a play of a bonus game is non-linearly increased by one-hundred credits.

In this example, to insure that each feature or feature combination pays out, on average, the same two-hundred-fifty credits per individual feature employed (i.e., the target average expected payout per feature employed), the normalization table or database of the gaming system disclosed herein associates different average expected bonus game supplemental award values to the different features and feature combinations as seen above in Table 1. Accordingly, the gaming system disclosed herein accounts for how one feature may affect another feature and utilizes differing average expected bonus game supplemental award values to normalize such an affect and provide that the average expected payout per feature employed or selected remains the same (or substantially the same) regardless of which feature or combination of features are selected to be utilized in the play of a bonus game.

In operation of one embodiment of the gaming system disclosed herein, the gaming system enables a player to accumulate one or more bonus game feature units in association with one or more plays of a base game. In this embodiment, when the player decides to selectively redeem one or more of that player's accumulated bonus game feature units in exchange for a play of a bonus game, the gaming system enables the player to select which feature or features to employ for that play of the bonus game. Each available feature costs the player one accumulated bonus game feature unit and the player may select any designated combination of features to employ for that play of the bonus game. After selecting which feature or features to employ, the gaming system provides the player a play of the bonus game utilizing the features selected by the player. For the play of the bonus game, the gaming system determines a bonus game outcome and provides the player any bonus game award associated with that determined bonus game outcome.

In addition to providing the player the bonus game award resulting from the play of the bonus game, the gaming system utilizes the maintained normalization table or database to determine a bonus game supplemental award. In one embodiment, this bonus game supplemental award is determined by randomly selecting a value from a weighted value table that is configured such that the average expected value of the weighted value table equals the average expected bonus game supplemental award value associated with the specific feature or combination of features employed for that play of the bonus game. For example, if the player selects to play the bonus game utilizing Feature C of Table 1, then the gaming system determines a bonus game supplemental award value by selecting a value from a weighted value table that has an average expected value of one-hundred-ninety-five credits (i.e., the average expected bonus game supplemental award value associated with Feature C). This determined bonus game supplemental award value is provided to the player in addition to the provided bonus game award associated with the play of the bonus game. Such configuration thus provides that, regardless of which feature or features a player employs for a play of a bonus game and thus regardless of how different features may affect the average expected payout for the play of the bonus game, the average expected award for each play of the bonus game (i.e., the total bonus game award average expected value per feature activated) is normalized or equated and thus players are not provided an advantage nor a disadvantage for combining certain features over other features.

Additional features and advantages are described herein, and will be apparent from the following Detailed Description and the figures.

BRIEF DESCRIPTION OF THE FIGURES

FIG. 4 (including portions FIG. 4A and FIG. 4B) is a table illustrating the different features and feature combinations available for a play of a bonus game and for each different feature/feature combination, the average expected payout for a play of the bonus game employing that feature/feature combination and the average expected bonus game supplemental award value for a play of the bonus game employing that feature/feature combination.

FIG. 5 is a table illustrating a weighted table of different bonus game supplemental award values for a play of the bonus game.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
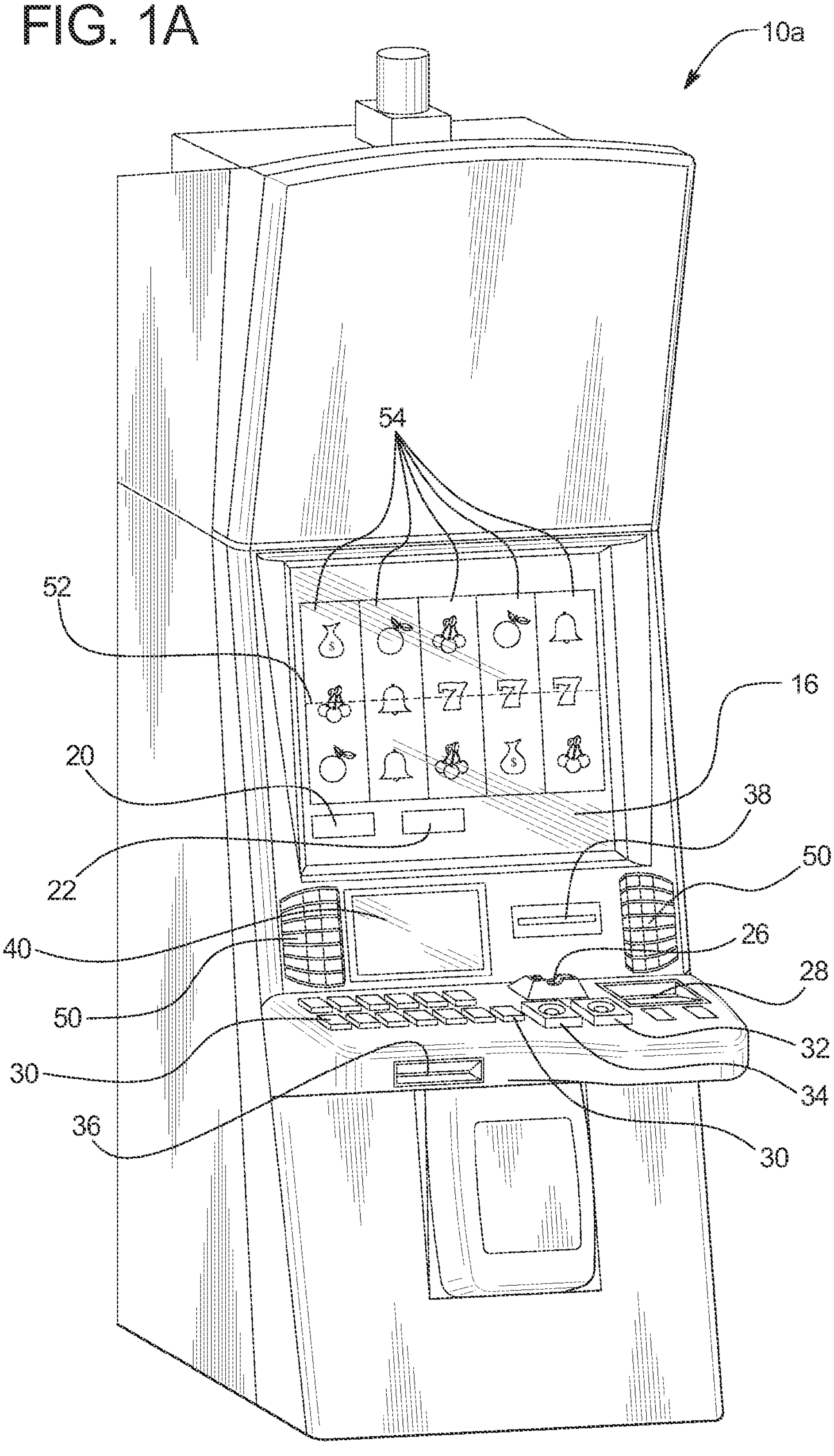
FIGS. 1A and 1B are front perspective views of alternative embodiments of gaming devices disclosed herein.
Figure 1B:
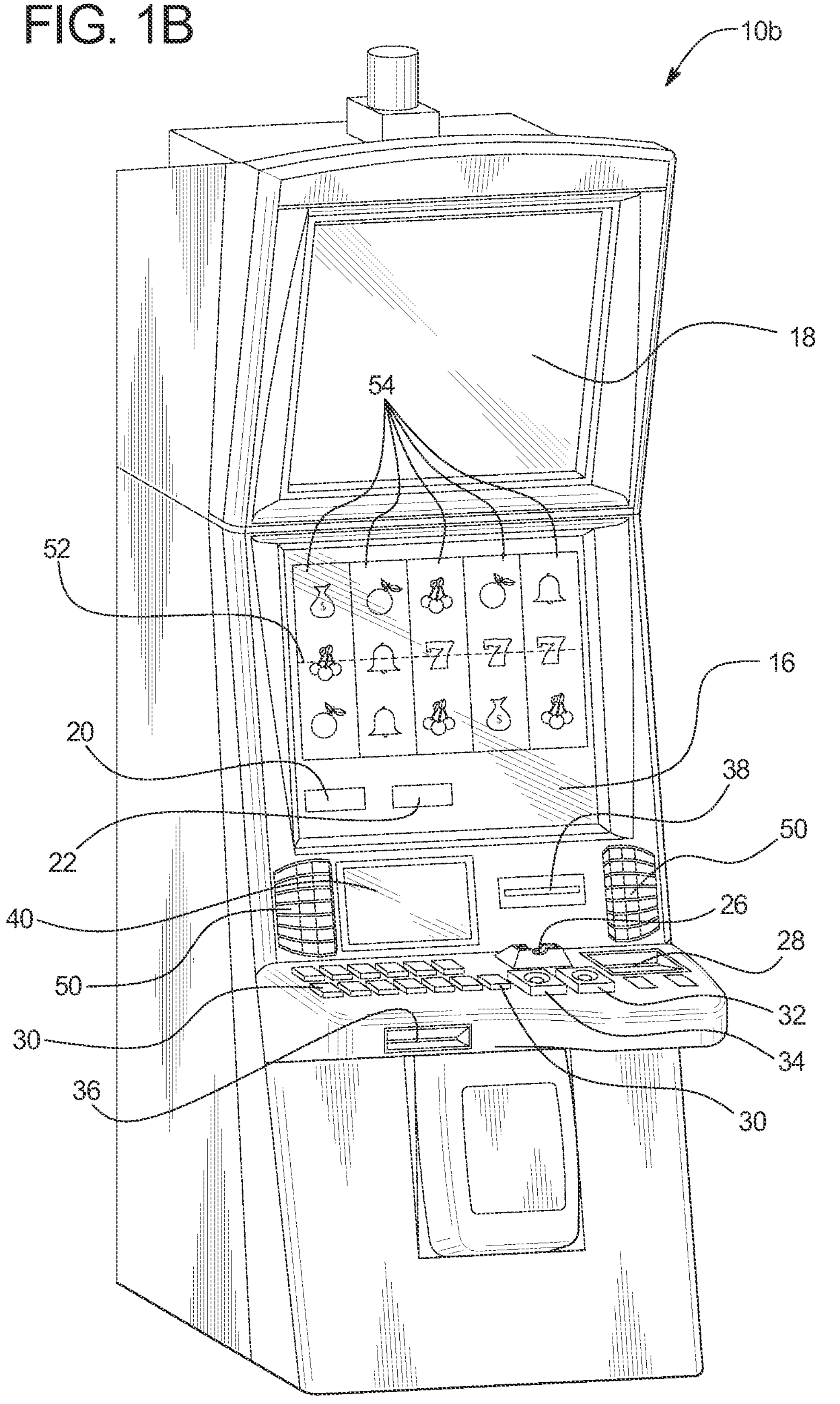

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
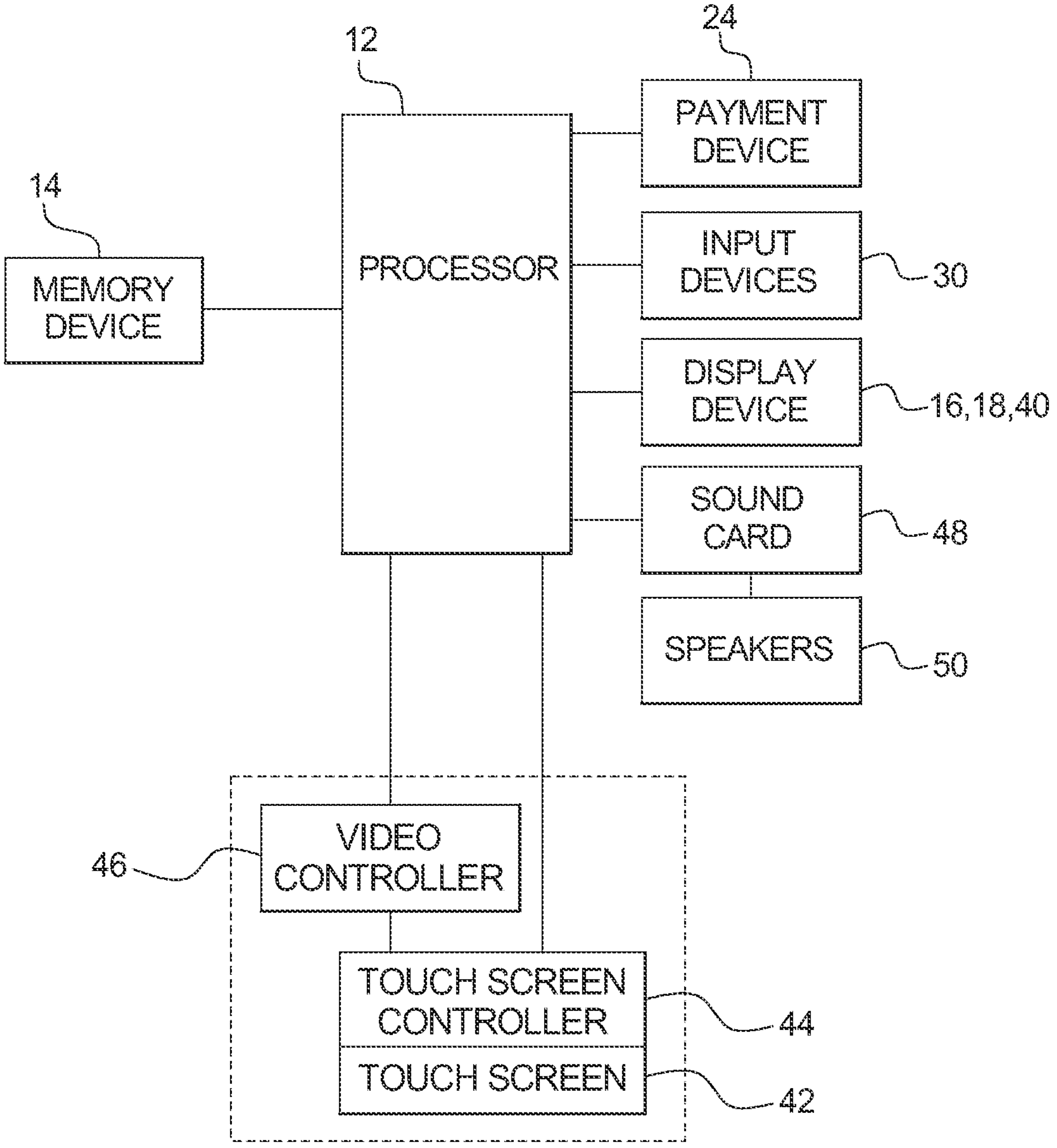
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as discussed in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as discussed above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
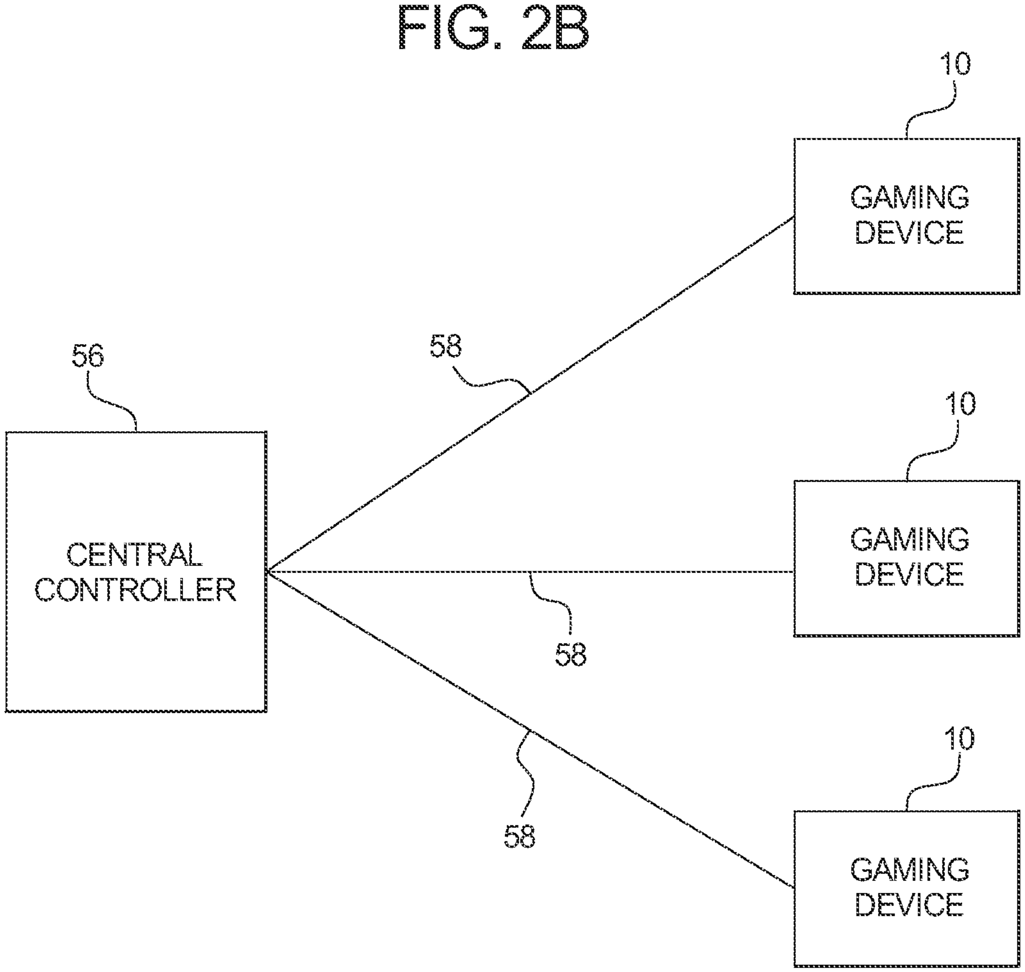
FIG. 2B is a schematic diagram of the central server in communication with a plurality of gaming devices in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Selecting Features of Bonus Game

Figure 3:
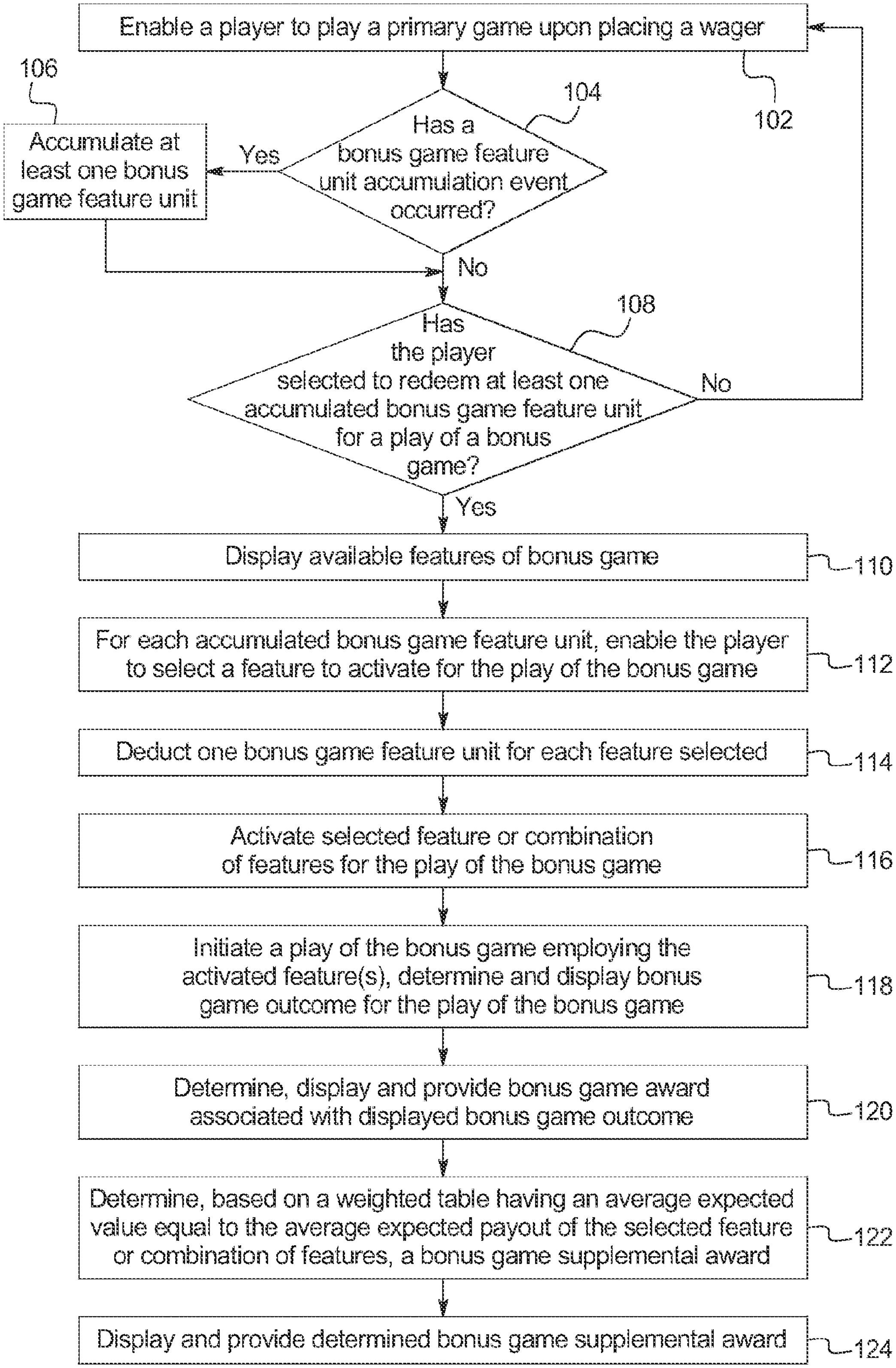
FIG. 3 is a flowchart of a method of one embodiment of the gaming system disclosed herein illustrating an accumulation and redemption of bonus game feature units for a play of an on-demand bonus game.

Referring now to FIG. 3, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 3, it should be appreciated that many other methods of performing the acts associated with this process may be used. For example, the order of certain steps described may be changed, or certain steps described may be optional.

In operation of this illustrated embodiment, as described above, the gaming system enables a player to play a primary game upon placing a wager as indicated in block 102.

In association with the play of the primary game, the gaming system determines if a bonus game feature unit accumulation event has occurred as indicated in diamond 104. In one embodiment, a bonus game feature unit accumulation event occurs in association with a displayed event of a play of a primary game at one or more of the gaming devices in the gaming system. In another embodiment, a bonus game feature unit accumulation event occurs independent of any displayed event in any play of any primary game at any of the gaming devices in the gaming system.

If a bonus game feature unit accumulation event occurs, the gaming system provides the player one or more bonus game feature units as indicated in block 106. In one embodiment, each bonus game feature unit represents a play of a bonus game in which a player selected feature is employed for that play of the bonus game. As described below, a plurality of different bonus game feature units can be simultaneously redeemed such that a plurality of different features are each employed for a single play of a bonus game.

In one embodiment, each bonus game feature unit has a target, theoretical or average expected value. In this embodiment, each bonus game feature unit has the same target value which the gaming system is configured to, on average, provide to a player for the redemption of that bonus game feature unit. It should be appreciated that prior to being redeemed, each different bonus game feature unit has a theoretical value because an actual value for each redeemed bonus game feature unit cannot be determined until one or more random determinations occur in association with the redemption of such bonus game feature units (as described below).

After accumulating one or more bonus game feature units or if no bonus game feature unit accumulation event occurs, the gaming system determines if the player has selected to redeem at least one accumulated bonus game feature unit for a play of a bonus game as indicated in diamond 108.

If the player has not selected to redeem at least one accumulated bonus game feature unit, the gaming system returns to block 102 and, as described above, enables the player to play a primary game upon placing another wager.

On the other hand, if the player has selected to redeem at least one accumulated bonus game feature unit, the gaming system displays the available features of the bonus game to the player as indicated in block 110. In different embodiments, the features available for activation in the play of the bonus game include, but are not limited to:

a. an applicable multiplier for the bonus game;
b. a quantity of modifier symbols for the bonus game;
c. a starting credit amount for the bonus game;
d. a value associated with at least one of the symbols in the bonus game;
e. a value associated with at least one winning payline in the bonus game
f. a quantity of picks in the bonus game;
g. a quantity of selections in the bonus game;
h. a quantity of wild symbols in the bonus game;
i. a quantity of wild reels in the bonus game;
j. a quantity of retrigger symbols in the bonus game;
k. a quantity of terminators or termination symbols in the bonus game;
l. a quantity of anti-terminators in the bonus game;
m. a quantity of locking reels in the bonus game;
n. a quantity of locking symbol positions in the bonus game;
o. a quantity of expanding symbols in the bonus game;
p. a quantity of award opportunities in the bonus game;
q. a quantity of progressive awards in the bonus game;
r. a range of available awards in the bonus game;
s. a maximum award in the bonus game;
t. a minimum award in the bonus game;
u. a quantity of active reels in the bonus game;
v. a quantity of active paylines in the bonus game;
w. a quantity of offers in the bonus game;
x. a paytable will be utilized in the bonus game;
y. an average expected award in the bonus game;
z. a quantity of hands of playing cards in the bonus game;
aa. a quantity of free spins in the bonus game;
bb. a quantity of free activations in the bonus game;

cc. a quantity of rounds or levels in the bonus game;

dd. any bonus game feature disclosed herein; and ee. any other suitable bonus game feature.

After displaying the available features for the play of the bonus game, for each accumulated bonus game feature unit, the gaming system enables the player to select a feature to activate for the play of the bonus game as indicated in block 112. In one embodiment, the gaming system enables the player to select a feature to activate for each of a designated quantity of features (i.e., up to a designated quantity of features can be simultaneously activated for a single play of the bonus game). For example, if the player has at least four bonus game feature units, the gaming system enables the player to select up to four different features to activate for the play of the bonus game. In another embodiment, the gaming system enables the player to select a feature to activate for each of the player's accumulated quantity of bonus game feature units (i.e., there is no preset limit to the quantity of features that can be simultaneously activated for a single play of the bonus game).

In one embodiment, each individual feature has an individual average expected value or average expected payout. That is, each individual feature has an individual average expected value or average expected payout which represents, on average, the additional payout of the bonus game when that feature is employed (compared to when that feature is not employed). In addition to each individual feature being associated with an individual average expected value or average expected payout, combinations of features have average expected values or average expected payouts. These average expected values or average expected payouts represents, on average, the additional payout of the bonus game when a particular combination of features are employed (compared to when that combination of features is not employed). It should be appreciated that certain combinations of features have an average expected payout that is non-linear to the sum of the average expected payouts of the individual features which form that combination of features. That is, certain features, when combined together, affect each other and result in a different average expected payout than the average expected payout of those features being awarded individually during separate plays of the bonus game.

After the player selects at least one bonus game feature to activate for the play of the bonus game, the gaming system deducts one bonus game feature unit for each bonus game feature selected and activates the selected feature or combination of selected features as indicated in blocks 114 and 116 of FIG. 3.

After activating one or more features for the play of the bonus game, the gaming system initiates a play of the bonus game employing the activated features and determines and displays a bonus game outcome for the play of the bonus game as indicated in block 118. The gaming system then determines, displays and provides the player the bonus game award associated with the displayed bonus game outcome as indicated in block 120. It should be appreciated that since the actual bonus game award provided to the player depends on one or more random determinations, the value of the actual bonus game award provided to the player may be the same as or different than the average expected payout associated with the play of the bonus game employing the feature or combination of features that the player selected to activate.

In addition to providing a bonus game award for the play of the bonus game, the gaming system also determines, based on the below-described weighted table having an average expected value equal to the average expected payout of the selected feature or combination of features, a bonus game supplemental award for the play of the bonus game as indicated in block 122. In one such embodiment, the gaming system determines the bonus game supplemental award utilizing at least one random determination that results, on average, in a bonus game supplemental award value that when combined with the average expected payout associated with the play of the bonus game employing the features that the player selected to activate results in a designated total bonus game award. In this embodiment, the resulting designated total bonus game award divided by the quantity of bonus game feature units redeemed for that play of the bonus game is equal to (or substantially equal to) the target value of the bonus game feature unit.

The gaming system then displays the determined bonus game supplemental award and provides this determined bonus game supplemental award to the player to conclude the play of the selectively redeemed bonus game as indicated in block 124. Accordingly, the gaming system of this embodiment provides the player a total bonus game award including the determined bonus game award and the determined bonus game supplemental award.

Specifically, in one embodiment, to determine the bonus game supplemental award, the gaming system maintains a normalization table or database of all possible features and combinations of features which can be selected for a play of a bonus game. The normalization table or database includes, for each different individual feature and each different combination of features: (i) an average expected payout or average expected bonus game award value for a play of a bonus game employing that feature (or that combination of features); and (ii) an average expected bonus game supplemental award value for a play of a bonus game employing that feature (or that combination of features). In this embodiment, the gaming system determines the average expected bonus game supplemental award value for each different individual feature (or each different combination of features) based on the average expected payout for a play of a bonus game employing that feature (or that combination of features) and the target average expected payout per employed feature. That is, for each different individual feature (or each different combination of different features), the gaming system accounts for the average expected payout associated with the play of the bonus game employing that feature (or combination of features), the target value associated with each bonus game feature unit and the quantity of bonus game feature units redeemed for the play of the bonus game to determine the average expected bonus game supplemental award value. Such a configuration provides that, regardless of which feature or combination of features is employed, for each individual feature and each combination of features, the average expected payout for that feature (or that combination of features) and the average expected bonus game supplemental award value for that feature (or that combination of features) result in the same average expected payout per feature and the same award value is provided to the player, on average, for each redeemed bonus game feature unit.

For example, FIG. 4 illustrates a normalization table or database in which six different features are available for selection and up to three different features can be simultaneously activated for a play of a bonus game. As seen in FIG. 4, for each different scenario of selected features, the normalization table or database includes: (i) the number of bonus game feature units redeemed to play a bonus game utilizing that feature or that combination of features; (ii) the average expected payout for a play of the bonus game utilizing that feature or that combination of features; (iii) the average expected bonus game supplemental award value for a play of a bonus game utilizing that feature or that combination of features; and (iv) the weighting of the top bonus game supplemental award value for a play of a bonus game utilizing that feature or that combination of features.

As seen in FIG. 4, the normalization table or database of the gaming system disclosed herein is configured such that for each individual feature, the average expected payout for that feature and the average expected bonus game supplemental award value for that feature result in the same (or substantially the same) average expected payout. That is, the normalization table or database is configured such that the total bonus game award average expected value per feature activated (i.e., per bonus game feature unit redeemed) is the same (or substantially the same). For example, if the target value associated with each bonus game feature unit redeemed is two-hundred-twenty-five credits, then the normalization table or database is configured such that Scenario #2 (which includes one bonus game feature unit redeemed to activate Feature #6) has: (i) an average expected payout for the play of the bonus game with Feature #6 activated of one-hundred-twenty credits, and (ii) an average expected bonus game supplemental award value of one-hundred-five credits, to result in a total average expected payout of two-hundred-twenty-five credits (for the one bonus game feature unit redeemed to activate Feature #6). In this example, the normalization table or database is further configured such that Scenario #16 (which includes one bonus game feature unit redeemed to activate Feature #2) has: (i) an average expected payout for the play of the bonus game with Feature #2 activated of one-hundred-thirty-five and a half credits, and (ii) an average expected bonus game supplemental award value of approximately eighty-nine and a half credits (and specifically 89.51111 credits), to also result in a total average expected payout of two-hundred-twenty-five credits (for the one bonus game feature unit redeemed to activate Feature #2). As seen in this example, the normalization table or database employed by the gaming system disclosed herein normalizes or equates the average expected payout for each bonus game feature unit redeemed such that regardless of which feature the player selects to play in the play of the bonus game, the total average expected payout for that play of the bonus game remains the same (or substantially the same).

As further seen in FIG. 4, the normalization table or database of the gaming system disclosed herein is configured such that for each combination of features, the average expected payout for that combination of features and the average expected bonus game supplemental award value for that combination of features result in the same (or substantially the same) average expected payout. For example, if the target value associated with each bonus game feature unit redeemed is two-hundred-twenty-five credits, then the normalization table or database is configured such that Scenario #4 (which includes two bonus game feature units redeemed to simultaneously activate Feature #5 and Feature #6) has: (i) an average expected payout for the play of the bonus game with Feature #5 and Feature #6 activated of two-hundred-twenty-twenty four and a half credits, and (ii) an average expected bonus game supplemental award value of approximately two-hundred-twenty-five and a half credits (specifically 225.5111 credits), to result in a total average expected payout of approximately four-hundred-fifty credits (and specifically 450.0111 credits) which is two-hundred-twenty-five credits per each bonus game feature unit redeemed. In this example, the normalization table or database is further configured such that Scenario #10 (which includes two bonus game feature units redeemed to simultaneously activate Feature #3 and Feature #6) has: (i) an average expected payout for the play of the bonus game with Feature #3 and Feature #6 activated of two-hundred-eighty-seven and a half credits, and (ii) an average expected bonus game supplemental award value of approximately one-hundred-sixty-two and a half credits (specifically 162.5111 credits), to also result in a total average expected payout of approximately four-hundred-fifty credits (and specifically 450.0111 credits) which is two-hundred-twenty-five credits per each bonus game feature unit redeemed. Thus, the gaming system of this example accounts for the different affects of different features on the average expected payout of the bonus game (i.e., Feature #3 when combined with Feature #6 has a greater average expected payout for the play of the bonus game than the combination of Feature #5 and Feature #6) in normalizing or equating the average expected payout for each bonus game feature unit redeemed. This configuration provides that regardless of which feature or combination of features the player selects to play in the play of the bonus game, the total average expected payout (per bonus game feature unit redeemed) for that play of the bonus game remains the same (or substantially the same).

In one embodiment, in determining the bonus game supplemental award, the gaming system utilizes the weighting of the top bonus game supplemental award value for a play of a bonus game having the player selected feature or combination of features in a weighted bonus game supplemental award value table or database. Such utilization provides that the average expected value of the weighted table or database equals (or substantially equals) the average expected value of the bonus game supplemental award for the play of the bonus game employing the player selected feature or combination of features. In this embodiment, the gaming system randomly selects a value from the weighted value table or database, wherein on average, the selected value will equal (or substantially equal to) the average expected value of the bonus game supplemental award for the play of the bonus game employing the feature or combination of features that the player selected to activate. It should be appreciated that since the determined bonus game supplemental award provided to the player depends on one or more random determinations, the value of the bonus game supplemental award provided to the player may be the same as or different than the average expected bonus game supplemental award value associated with the play of the bonus game employing the features that the player selected to activate.

For example, FIG. 5 illustrates an example weighted value table or database wherein the weighting of the top bonus game supplemental award value differs based on which feature or combination of features the player selected to employ for the play of the bonus game. In one such example, if the player redeemed one bonus game feature unit to activate Feature #6 (i.e., Scenario #2), the gaming system modifies the example weighted value table or database of FIG. 5 such that the top bonus game supplemental award value of two-thousand credits has a weighting of three-thousand-six-hundred. In this example, by such weighting of the top bonus game supplemental award value, the weighted value table or database has an average expected value of one-hundred-five credits which equals the average expected bonus game supplemental award value associated with the player redeeming one bonus game feature unit to activate Feature #6. It should be appreciated that as the quantity of features available for selection increases and the quantity of combinations of these features also increases, a weighted value table or database with weights for all but the top value remains the same (with only the weighting of the top value being modified) such that such a weighted value table is configured to be utilized regardless of any increases to the quantity of available selections.

Figure 6A:
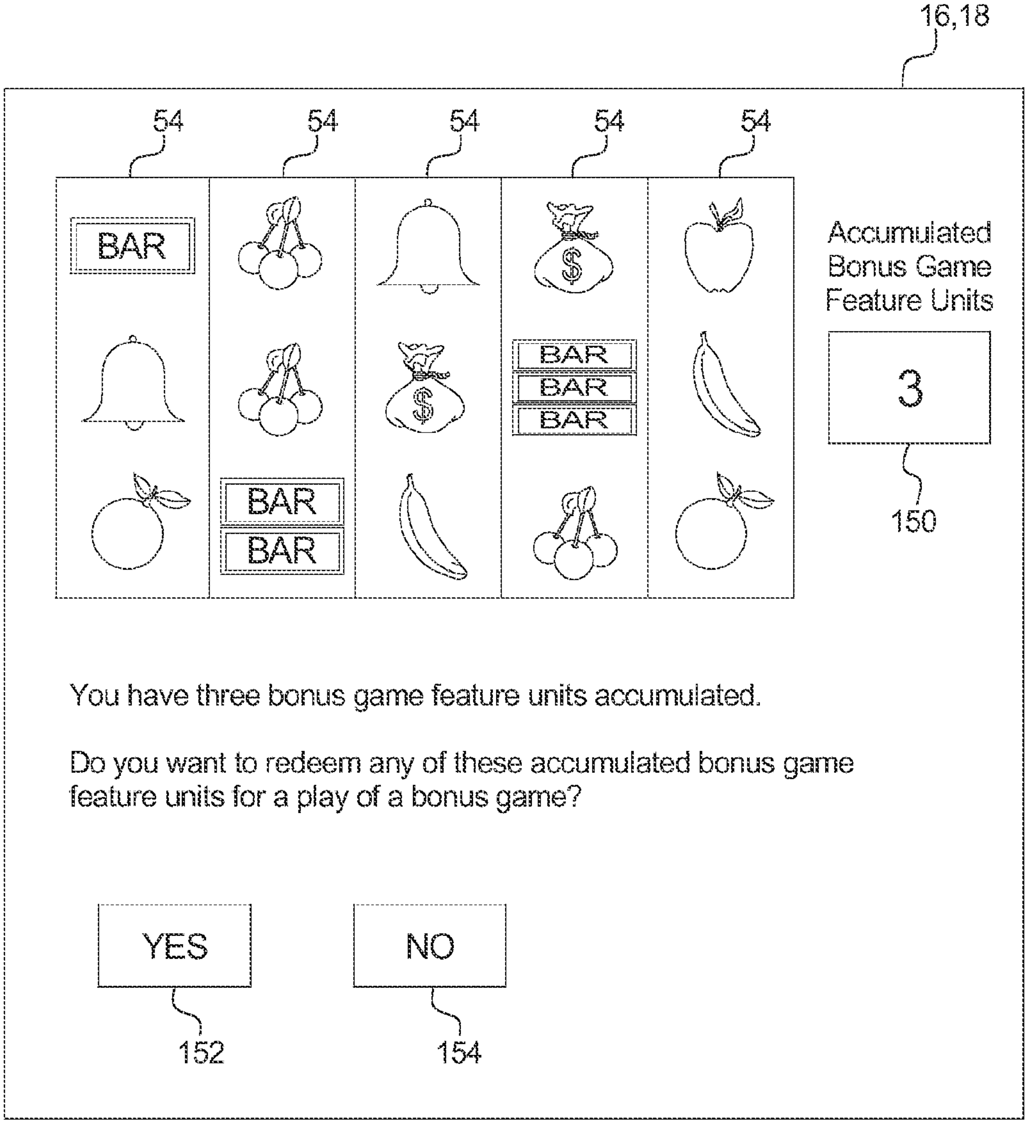
FIGS. 6A, 6B, 6C, 6D and 6E are front views of a display of one embodiment of the gaming system disclosed herein illustrating a selective play of a bonus game employing one or more features.

Turning now to FIGS. 6A to 6E, an example of a selectively redeemed play of the bonus game of one embodiment of the gaming system disclosed herein is illustrated. As seen in FIG. 6A, in this example, the player has previously accumulated three bonus game feature units as reflected in the bonus game feature unit meter 150. Since the player has at least one accumulated bonus game feature unit, the gaming system enables the player to indicate via inputs 152 and 154 if the player wants to selectively redeem one or more of these accumulated bonus game feature units for a play of a bonus game. In this example, the gaming system displays appropriate messages such as "YOU HAVE THREE BONUS GAME FEATURE UNITS ACCUMULATED" and "DO YOU WANT TO REDEEM ANY OF THESE ACCUMULATED BONUS GAME FEATURE UNITS FOR A PLAY OF A BONUS GAME?" to the player visually, or through suitable audio or audiovisual displays.

Figure 6B:
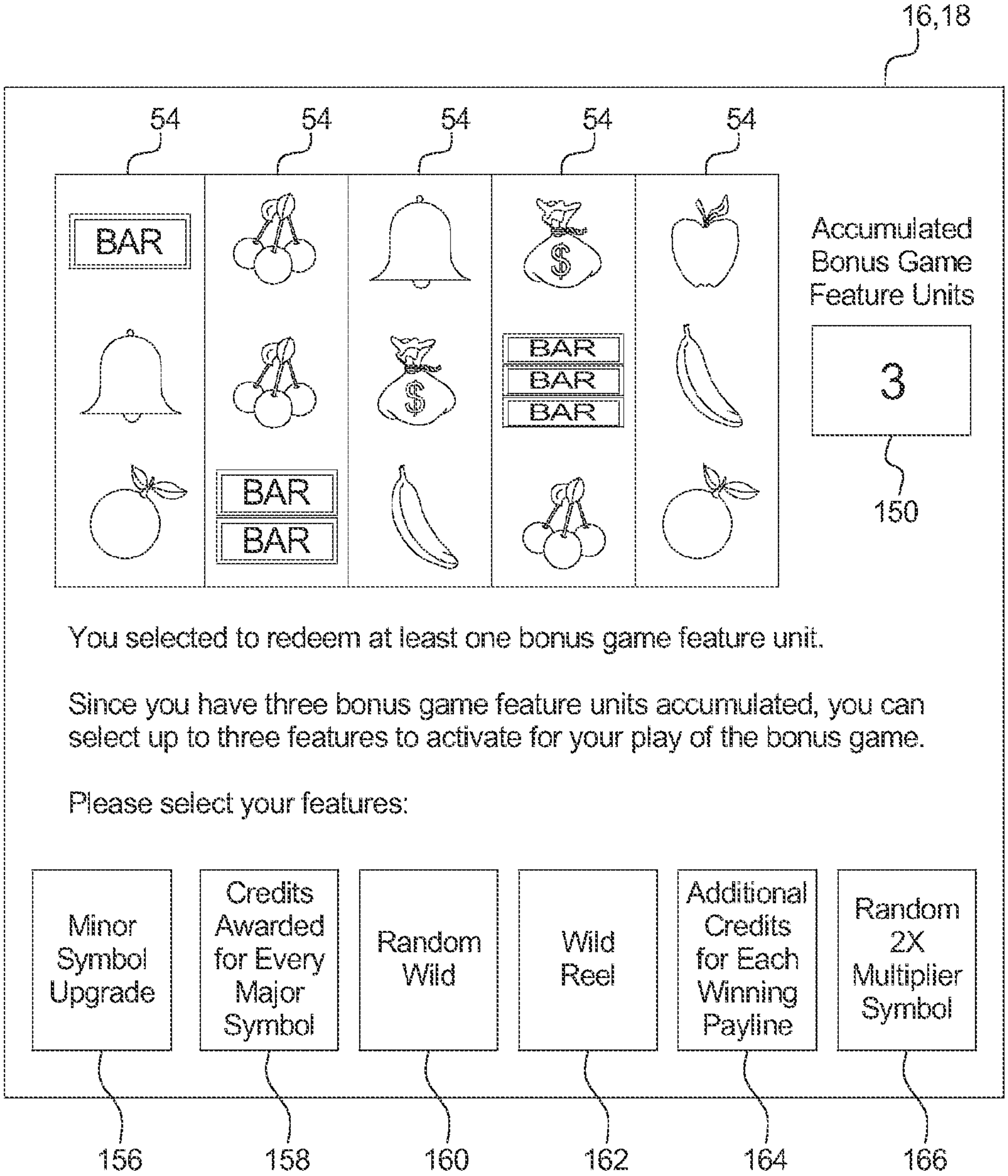

As seen in FIG. 6B, the gaming system determines that the player indicated they wanted to redeem at least one accumulated bonus game feature unit and displays the different bonus game features available to the player. In this example, the different bonus game features are:

(i) a minor symbol upgrade feature 156;

(ii) a credits awarded for every major symbol feature 158;

(iii) a random wild feature 160;

(iv) a wild reel feature 162;

(v) an additional credits for each winning payline feature 164; and (vi) a random 2× multiplier symbol feature 166.

More specifically, the minor symbol upgrade feature 156 includes transforming at least one winning symbol combination with at least one minor symbol to a winning symbol combination with at least one major symbol (and thus increasing the payout for certain winning symbol combinations). For example, for this feature, the determination of which minor symbols to transform occurs with choosing the highest minor symbol generated. Once the minor symbols are chosen, all occurrences of those minor symbols which are generated are transformed into major symbols.

The credits award for every major symbol feature 158 includes, for every winning symbol combination which includes a major symbol, a value selected from a weighted table or database and that value is provided to the player. For example, a value is selected from the following weighted table or database:

| Value | Weight |
|---|---|
| 5 | 5 |
| 10 | 15 |
| 15 | 20 |
| 20 | 7 |
| 25 | 4 |
| 30 | 2 |
| 35 | 1 |
| 40 | 1 |
| 50 | 1 |

and the selected value is provided to the player.

The random wild feature 160 includes adding random wild symbols to the reels (to increase the probability of each winning symbol combination being generated). For example, the following "number of wild symbols" weighted table or database is queried to determine the number of wild symbols added to the reels.

| Number of Wild Symbols: | |
|---|---|
| # | Weight |
| 1 | 25 |
| 2 | 100 |
| 3 | 300 |
| 4 | 100 |
| 5 | 25 |
| 6 | 5 |
| 7 | 2 |
| 8 | 1 |
| 9 | 1 |
| 10 | 1 |

After determining the number of wild symbols to add to the reel, for each of the determined number of wild symbols to be added, the following "wild symbol reel" weighted table or database is queried, to determine the reel that wild symbol will be associated with.

| Reel: | |
|---|---|
| Reel | Weight |
| 1 | 2 |
| 2 | 40 |
| 3 | 3 |
| 4 | 20 |
| 5 | 5 |

For each of the determined number of wild symbols, the wild symbol is then randomly placed at a symbol position of the determined reel.

The wild reel feature 162 includes spinning a reel including wild symbols and transparent ghosts or transparent blank symbols over one or more reels to randomly generate zero, one or more wild symbols. For example, a reel including the following configuration is utilized over the third reel for the wild reel feature:

| Wild Reel: | |
|---|---|
| Stops | Weights |
| 1 | 75 |
| 0 | 0 |
| 0 | 0 |
| 0 | 0 |
| 0 | 75 |
| 1 | 0 |
| 0 | 0 |
| 0 | 0 |
| 0 | 75 |
| 0 | 0 |
| 1 | 0 |
| 0 | 0 |
| 0 | 75 |
| 0 | 0 |
| 0 | 0 |
| 1 | 0 |
| 1 | 30 |
| 1 | 0 |
| 0 | 0 |
| 0 | 0 |
| 1 | 30 |
| 0 | 0 |
| 1 | 0 |
| 0 | 0 |
| 1 | 30 |
| 0 | 0 |
| 0 | 0 |
| 1 | 0 |

-continued

| Wild Reel: | |
|---|---|
| Stops | Weights |
| 0 | 30 |
| 1 | 0 |
| 1 | 0 |
| 0 | 0 |
| 0 | 30 |
| 1 | 0 |
| 0 | 0 |
| 1 | 0 |
| 0 | 30 |
| 0 | 0 |
| 1 | 0 |
| 1 | 0 |
| 1 | 5 |
| 1 | 0 |
| 1 | 0 |
| 0 | 0 |
| 1 | 5 |
| 1 | 0 |
| 0 | 0 |
| 1 | 0 |
| 1 | 5 |
| 0 | 0 |
| 1 | 0 |
| 1 | 0 |
| 0 | 5 |
| 1 | 0 |
| 1 | 0 |
| 1 | 0 |
| 1 | 1 |
| 1 | 0 |
| 1 | 0 |
| 1 | 0 |

The additional credits per winning payline feature 164 includes providing the player an additional quantity of credits for every payline with a winning symbol combination. For example, the gaming system provides the player an additional twenty credits for each payline determined to be a winning payline during the bonus game.

The random 2× multiplier symbol feature 166 includes selecting a reel and randomly placing a 2× multiplier symbol on that reel. For example, a reel is selected from the following "2× multiplier reel" weighted table or database:

| Reel: | |
|---|---|
| reel | weight |
| 0 | 0 |
| 1 | 40 |
| 2 | 2 |
| 3 | 5 |
| 4 | 0 |

and a single 2× multiplier symbol is randomly associated with one of the symbol positions of the selected reel.

Turning back to FIG. 6B, after displaying the different bonus game features available to the player, the gaming system enables the player to select one or more (and up to three) bonus game features to activate or employ for the play of the bonus game. In this example, the gaming system displays appropriate messages such as "YOU SELECTED TO REDEEM AT LEAST ONE BONUS GAME FEATURE UNIT", "SINCE YOU HAVE THREE BONUS GAME FEATURE UNITS ACCUMULATED, YOU CAN SELECT UP TO THREE FEATURES TO ACTIVATE FOR YOUR PLAY OF THE BONUS GAME" and "PLEASE SELECT YOU FEATURES" to the player visually, or through suitable audio or audiovisual displays.

Figure 6C:
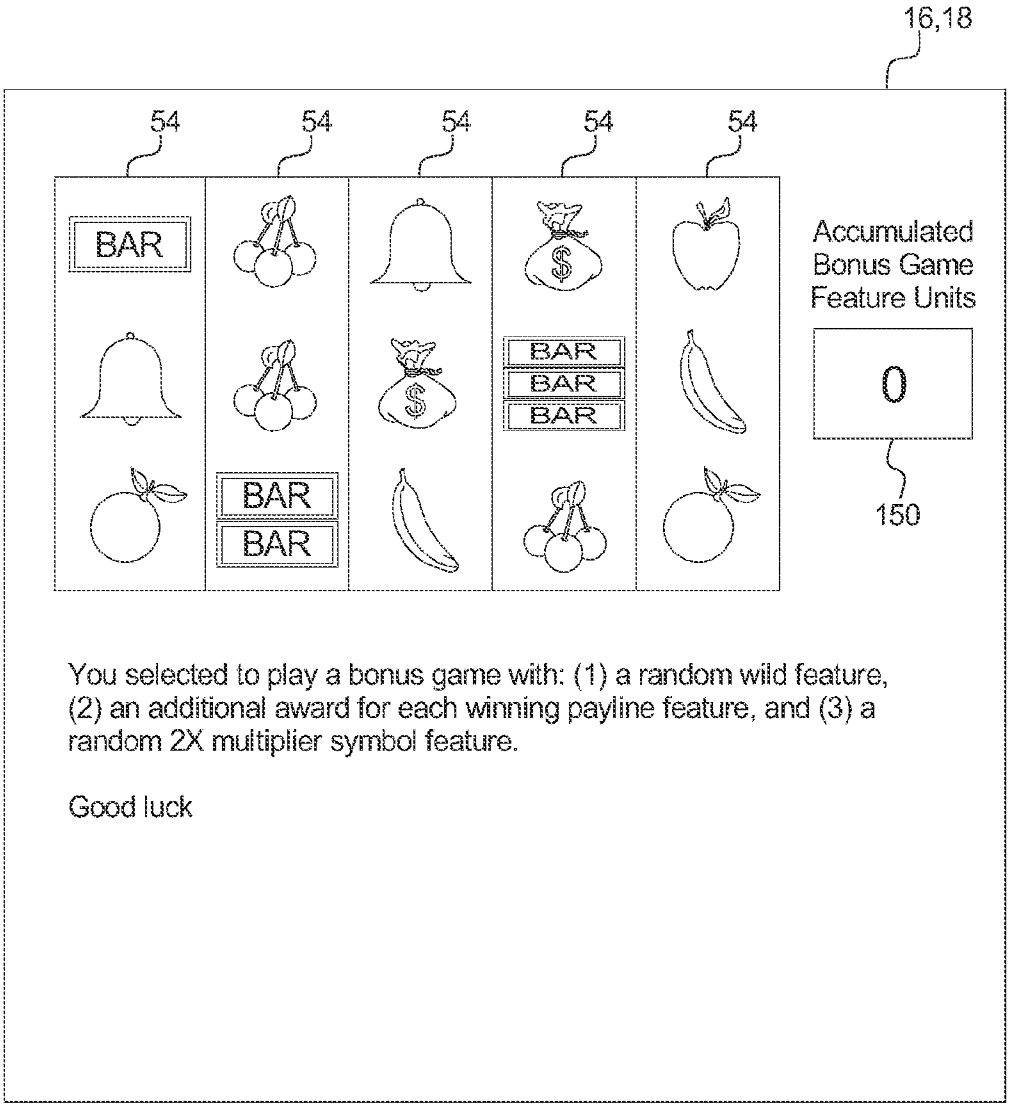

As seen in FIG. 6C, the player selected three different features and the gaming system deducted one bonus game feature unit for each feature the player selected to activate for the play of the bonus game (i.e., the bonus game feature unit meter 150 is updated to reflect zero bonus game feature units currently accumulated). In this example, the gaming system displays appropriate messages such as "YOU SELECTED TO PLAY A BONUS GAME WITH (1) A RANDOM WILD FEATURE, (2) AN ADDITIONAL AWARD FOR EACH WINNING PAYLINE FEATURE, AND (3) A RANDOM 2× MULTIPLIER SYMBOL FEATURE" and "GOOD LUCK" to the player visually, or through suitable audio or audiovisual displays.

Figure 6D:
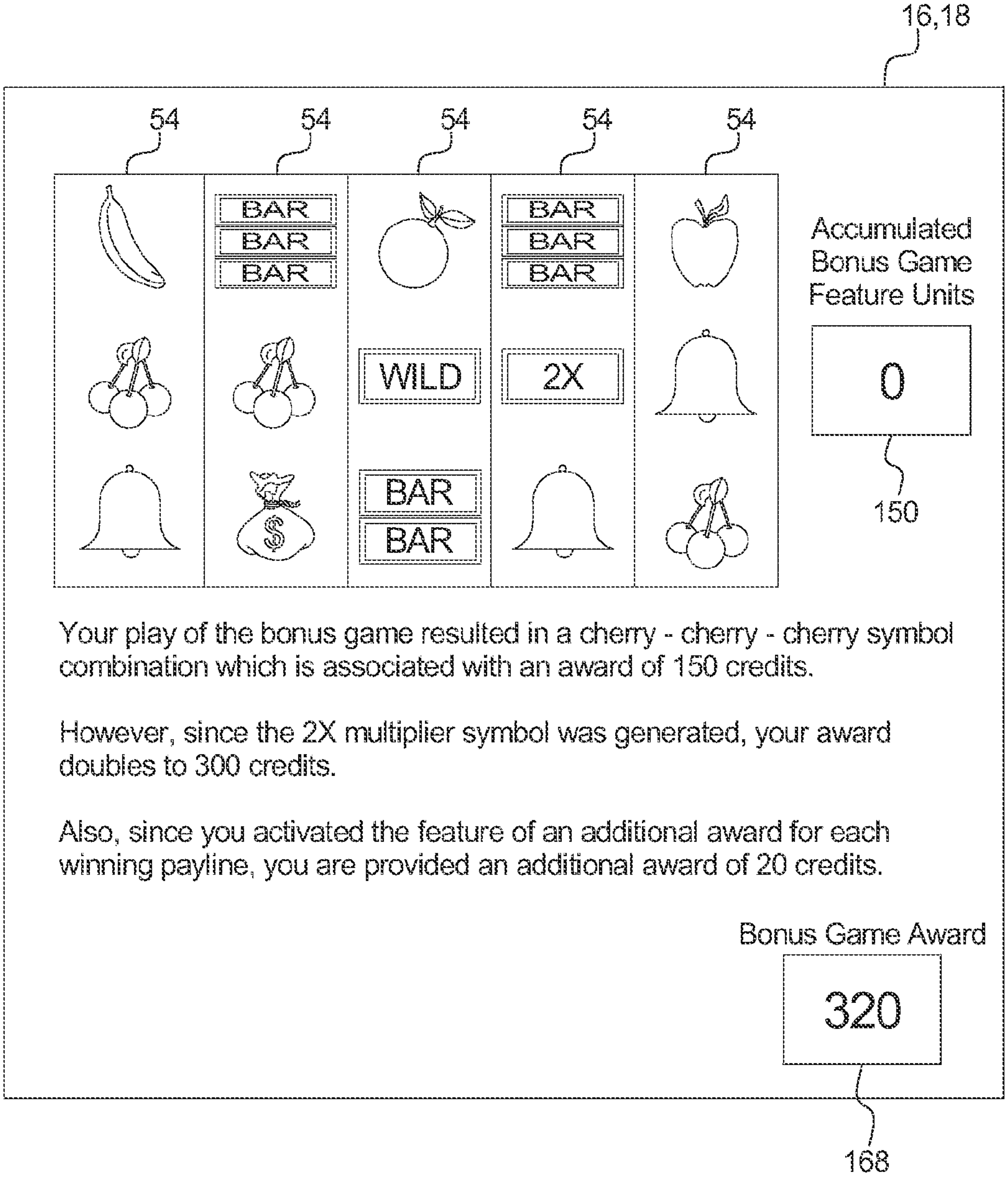

As seen in FIG. 6D, the gaming system activates the features selected by the player and determines a bonus game outcome for the play of the bonus game. The gaming system then determines and displays a bonus game award associated with the determined bonus game outcome. In this example, based on the symbols randomly generated on the reels and the bonus game features activated by the player, the gaming system determines an award of three-hundred-twenty credits. Specifically, the gaming system determines that: (i) the cherry symbol-cherry symbol-wild symbol combination randomly generated (i.e., the player selected random wild feature) is associated with an award of one-hundred-fifty credits, (ii) the 2× multiplier symbol is randomly generated (i.e., the player selected random 2× multiplier symbol feature) to modify the award to three-hundred credits, and (iii) a winning symbol combination was generated on one winning payline (i.e., the additional award for each winning payline feature) to increase the award by twenty credits to three-hundred-twenty credits as indicated in bonus game award meter 168. In this example, the gaming system displays appropriate messages such as "YOUR PLAY OF THE BONUS GAME RESULTED IN A CHERRY-CHERRY-CHERRY SYMBOL COMBINATION WHICH IS ASSOCIATED WITH AN AWARD OF 150 CREDITS", "HOWEVER, SINCE THE 2× MULTIPLIER SYMBOL WAS GENERATED, YOUR AWARD DOUBLES TO 300 CREDITS" and "ALSO, SINCE YOU ACTIVATED THE FEATURE OF AN ADDITIONAL AWARD FOR EACH WINNING PAYLINE, YOU ARE PROVIDED AN ADDITION AWARD OF TWENTY CREDITS" to the player visually, or through suitable audio or audiovisual displays.

Referring back to the normalization table or database of FIG. 4, it should be appreciated that this determined actual bonus game award of three-hundred-twenty credits is less than the average expected bonus game award of four-hundred-sixty-two credits associated with a play of a bonus game employing the three features selected by the player. That is, while the play of a bonus game employing the three features selected by the player will, on average, provide an award of four-hundred-sixty-two credits to the player, since the actual bonus game award provided is based on one or more random determinations, the actual bonus game award is often less than or greater than the average expected bonus game award for the play of the bonus game employing those features.

Figure 6E:
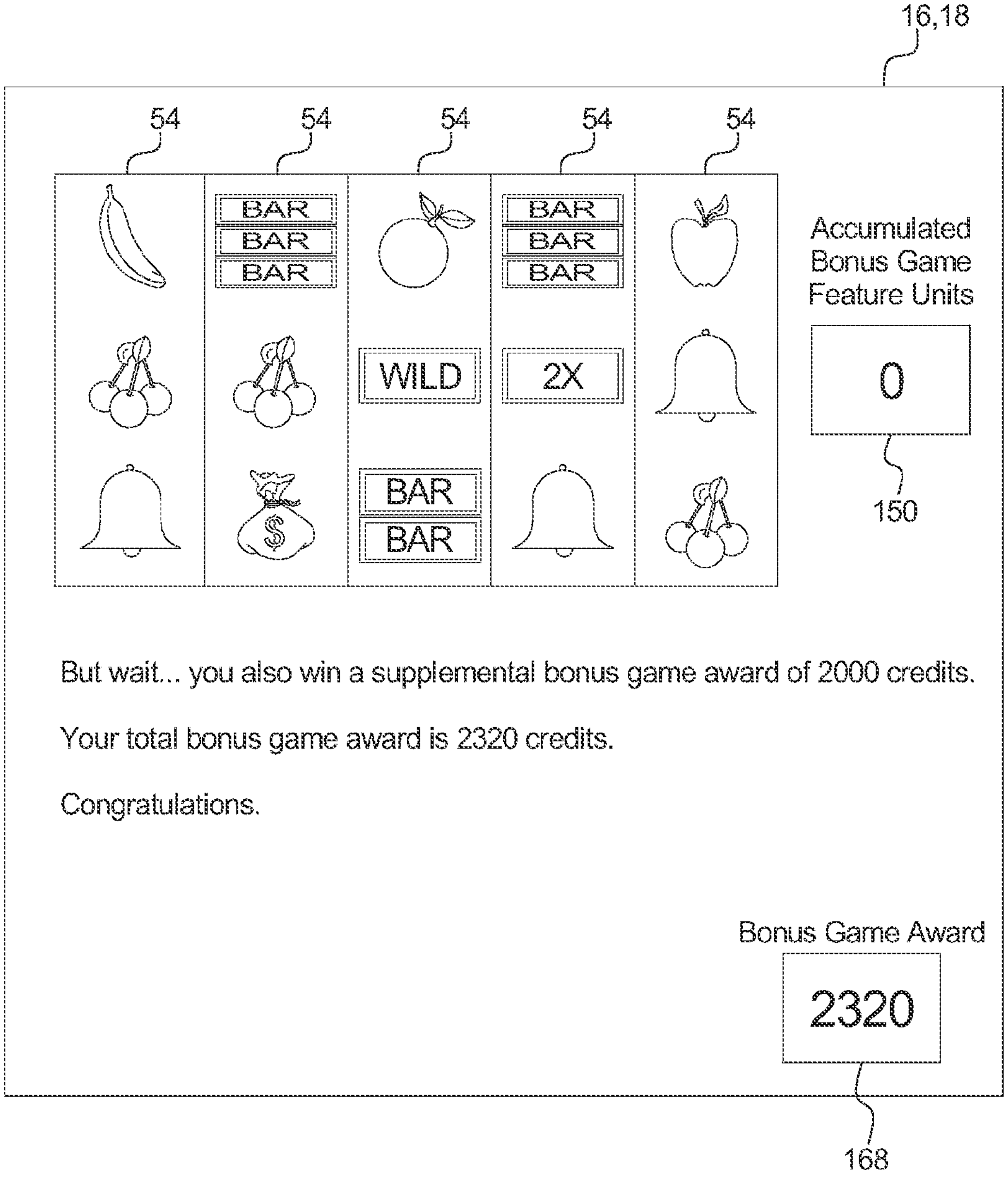

As seen in FIG. 6E, after determining the bonus game award for the play of the bonus game, the gaming system determines a supplemental bonus game award to provide to the player. In this example, utilizing: (i) the weighting of the top bonus game supplemental award value for a play of a bonus game employing the three features selected by the player of the normalization table or database of FIG. 4 and the bonus game supplemental award value table or database of FIG. 5, the gaming system randomly selects a supplemental award value from the following weighted table (which is associated with an average expected value of two-hundred-thirteen credits):

| Bonus Game Supplemental Award Value Table: | |
|---|---|
| Value | Weight |
| 5 | 10000 |
| 10 | 10000 |
| 15 | 10000 |
| 20 | 10000 |
| 25 | 10000 |
| 30 | 10000 |
| 35 | 10000 |
| 40 | 10000 |
| 45 | 10000 |
| 2000 | 8460 |

In this example, as seen in FIG. 6E, the gaming system randomly selected a bonus game supplemental award value of two-thousand credits. That is, based on the weightings assigned or associated with each of the bonus game supplemental award values for this on-demand bonus game, the gaming system randomly selected the bonus game supplemental award value of two-thousand credits. Accordingly, this two-thousand credits is displayed to the player and the player's total bonus game award of two-thousand-three-hundred-twenty credits is provided to the player as indicated in bonus game award meter 168. Upon providing the player the total bonus game award, the play of the on-demand bonus game ends. In this example, the gaming system displays appropriate messages such as "BUT WAIT . . . YOU ALSO WIN A SUPPLEMENTAL BONUS GAME AWARD OF 2000 CREDITS", "YOUR TOTAL BONUS GAME AWARD IS 2320 CREDITS" and "CONGRATULATIONS" to the player visually, or through suitable audio or audiovisual displays.

Referring back to the normalization table or database of FIG. 4, it should be appreciated that this determined actual bonus game supplemental award of two-thousand credits is greater than the average expected bonus game supplemental award of two-hundred-thirteen credits associated with a play of a bonus game employing the three features selected by the player. That is, while the play of a bonus game employing the three features selected by the player will, on average, provide a supplemental award of two-hundred-thirteen credits to the player, since the actual bonus game supplemental award provided is based on one or more random determinations, the actual bonus game supplemental award is often less than or greater than the average expected bonus game supplemental award for the play of the bonus game employing those features.

Bonus Game Feature Units

In one embodiment, a bonus game feature unit accumulation event occurs based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes the bonus game feature unit accumulation event to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another embodiment of the gaming system disclosed herein, a bonus game feature unit accumulation event occurs based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes the bonus game feature unit accumulation event to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another embodiment of the gaming system disclosed herein, a bonus game feature unit accumulation event occurs based on a predefined variable reaching a defined parameter threshold. For example, when the 500,000$^{th}$ player has played a gaming device of the gaming system (ascertained from a player tracking system), the bonus game feature unit accumulation event occurs. In different embodiments, the predefined parameter thresholds include a length of time, a length of time after a certain dollar amount is hit, a wager level threshold for a specific machine (which gaming device is the first to contribute $250,000), a number of gaming devices active, or any other parameter that defines a suitable threshold.

In another embodiment of the gaming system disclosed herein, a bonus game feature unit accumulation event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts or otherwise associates their player tracking card with the gaming device. The central server/gaming device processor determines the player tracking level of the player and if the current player tracking level defined by the gaming system operator is eligible for the bonus game feature unit accumulation event. In one embodiment, the gaming system operator defines minimum bet levels required for the bonus game feature unit accumulation event to occur based on the player's card level.

In another embodiment of the gaming system disclosed herein, a bonus game feature unit accumulation event occurs based on a system determination, including one or more random selections by the central controller. In one embodiment, as discussed above, the central controller tracks all active gaming devices and the wagers they placed. Each gaming device has its own entry defining its state as either active or inactive and also defining the values of the wagers from that gaming device. In one embodiment, active status means that the gaming device is being actively played by a player and enrolled/inactive status means that the gaming device is not being actively played by a player. The active status requirements can be based on any suitable number of satisfied criteria or defined in any suitable manner by the implementer of the gaming system. In one such embodiment, based on the gaming device's state as well as one or more wager pools associated with the gaming device, the central controller determines whether the bonus game feature unit accumulation event to occur. In one such embodiment, the player who consistently places a higher wager is more likely to be associated with an occurrence of the bonus game feature unit accumulation event than a player who consistently places a minimum wager. It should be appreciated that the criteria for determining whether a player is in active status or inactive status for determining if the bonus game feature unit accumulation event will occur may be the same as, substantially the same as, or different than the criteria for determining whether a player is in active status or inactive status for another bonus game feature unit accumulation event to occur.

In another embodiment of the gaming system disclosed herein, a bonus game feature unit accumulation event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, the bonus game feature unit accumulation event will occur.

In another embodiment, a bonus game feature unit accumulation event occurs independent of any displayed event in any play of any game of any of the gaming devices in the gaming system. That is, the bonus game feature unit accumulation event is based on a trigger that is unknown to the player (i.e., a mystery trigger). In another embodiment, the gaming system tracks the occurrences of one or more suitable events occurring at or in association with one or more players and/or one or more gaming devices in the gaming system and determines, based on these tracked events, whether a bonus game feature unit accumulation event will occur. In another embodiment, the gaming system defines one or more game play parameters, wherein each time a player's tracked game play activity satisfies the defined parameter, the bonus game feature unit accumulation event occurs. It should be appreciated that any suitable manner of causing the bonus game feature unit accumulation event to be provided may be implemented in accordance with the gaming system and method disclosed herein.

In different embodiments, one or more bonus game feature unit accumulation events may occur for each play of a primary game. In one such embodiment, each play of a primary game in which a plurality of paylines are wagered on provides the player multiple opportunities to accumulate bonus game feature units. For example, for one play of a primary game, a first bonus game feature unit generating symbol combination on a first payline may cause a first bonus game feature unit accumulation event which results in an accumulation of a first quantity of bonus game feature units and a second bonus game feature unit generating symbol combination on a second payline may cause a second bonus game feature unit accumulation event which results in an accumulation of a second quantity of bonus game feature units. Accordingly, in association with a play of a primary game, a plurality of events may occur which result in a plurality of quantities of bonus game feature units provided to the player.

In one embodiment, the gaming machines of the gaming system are operable to cause multiple bonus game feature unit accumulation events to occur for multiple players at multiple linked gaming machines at the same time or substantially the same time. Alternatively, the gaming machines of the gaming system are operable to cause multiple bonus game feature unit accumulation events to occur for multiple players at multiple linked gaming machines in an overlapping or sequential manner. In one such embodiment, an occurrence of a bonus game feature unit accumulation event results in a plurality of players each receiving one or more bonus game feature units.

In one embodiment, the gaming system enables a player to store any accumulated bonus game feature units in association with a player tracking account. In this embodiment, if a player does not elect to redeem one or more accumulated bonus game feature units for a play of a bonus game, the gaming system stores any bonus game feature units in that player's account to be redeemed at a later time. In this embodiment, since the bonus game feature units are stored by the gaming system in the player's account, such bonus game feature units are transferable and the player may earn and redeem such bonus game feature units at a plurality of different gaming devices in the gaming establishment.

In one embodiment, the gaming system establishes a gaming device account for accumulating bonus game feature units. In such embodiments, either a player or a gaming establishment operator can elect for a gaming device to participate in the accumulation of bonus game feature units, wherein if the gaming device is determined to participate in the accumulation of bonus game feature units, the gaming system establishes an account (or otherwise accesses a previously established account) for the gaming device. It should be appreciated that in this embodiment, the accumulation of one or more bonus game feature units are stored in an account associated with the gaming device and are not specific to the player that is playing that gaming device at any particular point in time.

In another embodiment, accumulated bonus game feature units are associated with an expiration date and time. In this embodiment, the gaming system/gaming device is configured to communicate to the player the proximity of the expiration of any stored bonus game feature units (i.e., "your bonus game feature units will expire at 6:00 am tomorrow"). In one embodiment, such notice of expiration of stored bonus game feature units is at the player's currently played gaming device. In another embodiment, such notice of expiration of stored bonus game feature units is external from the player's currently played gaming device, such as via e-mail. In different embodiments, bonus game feature units accumulated at different times are redeemed in order of expiration (first to expire shows first), or in order of first earned basis.

In another embodiment, the gaming system enables a player to purchase a designated quantity of bonus game feature units. In this embodiment, rather than accumulating bonus game feature units based on one or more aspects of game play, the gaming system enables the player to directly or indirectly purchase one or more bonus game feature units. In another embodiment, the gaming system funds a player's account with one or more bonus game feature units in association with a promotion. In this embodiment, the central server provides one or more bonus game feature units to a player for accepting or participating in a promotion. For example, in exchange for signing up for a gaming establishment's player loyalty club, for visiting a gaming establishment's website or some activity thereon, such as learning about a new game, or for trying a new game, the central server funds a player's account with one or more bonus game feature units. In another embodiment, the central server is configured to fund a player's account with modified quantities of bonus game feature units for a bonus game feature unit accumulation event occurring in association with a promotion. For example, during a designated promotion time at a gaming establishment, the central server funds a player's account with double bonus game feature units compared to the quantity of bonus game feature units the player would have received during the non-promotion time. In another embodiment, a bonus game feature unit accumulation event occurs in association with a player purchasing one or more items.

Alternative Embodiments

In one alternative embodiment, the gaming system selects one or more of the bonus game features to employ for a play of a bonus game. In one such embodiment, the player indicates a quantity of accumulated bonus game feature units to redeem and the gaming system selects a bonus game feature to employ for one or more of these redeemed bonus game feature units. In another embodiment, the gaming system selects at least one bonus game feature to employ for a play of a bonus game and the player selects at least one bonus game feature to employ for the play of the bonus game.

In various embodiments, one or more of:

(a) the frequency of accumulating one or more bonus game feature units;

(b) the quantity of bonus game feature units accumulated per bonus game feature unit accumulation event that occurs;

(c) the quantity of bonus game features units required to activate one or more different features;

(d) the quantity of different features that may be simultaneously activated for a single play of the bonus game;

(e) the different features available to be activated for a play of the bonus game;

(f) the different values of the bonus game supplemental award value table;

(g) the quantity of different values of the bonus game supplemental award value table that have a weighting that is modified based on the player selected features of the bonus game;

(h) the quantity of plays of the bonus game that may be played before a winning outcome associated with an award is generated;

(i) the order in which activated features are applied to the bonus game outcome for the play of the bonus game; and (j) any other determination made by the gaming system disclosed herein are predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

at least one display device supported by the housing;

a plurality of input devices supported by the housing, said plurality of input devices including:

(i) an acceptor, and (ii) a cashout device;

at least one processor; and at least one memory device which stores a plurality of instructions, which when executed by the at least one processor, cause the at least one processor to operate with the at least one display device and the plurality of input devices to:

(a) if a physical item is received via the acceptor, establish a credit balance based, at least in part, on a monetary value associated with the received physical item, (b) for a play of a game:

(i) enable a player to select a combination of at least two different game features of a plurality of different game features to activate, wherein at least two of said different game features are each associated with a different average expected value, such that a first combination of a first quantity of at least two different game features is associated with a first average expected value and a second, different combination of the first quantity of at least two different game features is associated with a second, different average expected value, (ii) activate each of the selected game features, (ii) determine, based at least in part on the activated game features, a game outcome, (iv) display the determined game outcome, (v) determine a game award, said determined game award being based at least in part on the determined game outcome, and (vi) display the determined game award, and (c) if a cashout input is received via the cashout device, cause an initiation of any payout associated with the credit balance.

2. The gaming system of claim 1, wherein when executed by the at least one processor, the plurality of instructions cause the at least one processor to:

determine a supplemental award, said determination being based at least in part on the activated game features such that regardless of which game features the player selected to activate, an average expected payout for the play of the game is the same per game feature activated, and display the determined supplemental award.

3. The gaming system of claim 1, wherein each of said different game features is associated with a different average expected value.

4. The gaming system of claim 1, wherein the play of the game includes a play of an on-demand bonus game.

5. The gaming system of claim 1, wherein the determined game award is at least one selected from the group of: a quantity of monetary credits, a quantity of non-monetary credits, a quantity of promotional credits, and a quantity of player tracking points.

6. A gaming system server comprising:

at least one processor; and at least one memory device which stores a plurality of instructions, which when executed by the at least one processor, cause the at least one processor to, for a play of a game:

(a) receive data associated with a player selection of a combination of at least two different game features of a plurality of different game features to activate, wherein at least two of said different game features are each associated with a different average expected value, such that a first combination of a first quantity of at least two different game features is associated with a first average expected value and a second, different combination of the first quantity of at least two different game features is associated with a second, different average expected value, (b) activate each of the selected game features, (c) determine, based at least in part on the activated game features, a game outcome, (d) cause at least one display device to display the determined game outcome, (e) determine a game award, said determined game award being based at least in part on the determined game outcome, and (f) cause the at least one display device to display the determined game award, wherein a credit balance is increasable based on the determined game award, said credit balance being increasable via an acceptor of a physical item associated with a monetary value, and said credit balance being decreasable via a cashout device.

7. The gaming system server of claim 6, wherein when executed by the at least one processor, the plurality of instructions cause the at least one processor to:

determine a supplemental award, said determination being based at least in part on the activated game features such that regardless of which game features the player selected to activate, an average expected payout for the play of the game is the same per game feature activated, and cause the at least one display device to display the determined supplemental award.

8. The gaming system server of claim 6, wherein each of said different game features is associated with a different average expected value.

9. The gaming system server of claim 6, wherein the play of the game includes a play of an on-demand bonus game.

10. The gaming system server of claim 6, wherein the determined game award is at least one selected from the group of: a quantity of monetary credits, a quantity of non-monetary credits, a quantity of promotional credits, and a quantity of player tracking points.

11. The gaming system server of claim 6, which transmits and receives data over a data network.

12. The gaming system server of claim 11, wherein the data network is an internet.

13. A method of operating a gaming system, said method comprising:

(a) receiving, for a play of a game, a player selection of a combination of at least two different game features of a plurality of different game features to activate, wherein at least two of said different game features are each associated with a different average expected value, such that a first combination of a first quantity of at least two different game features is associated with a first average expected value and a second, different combination of the first quantity of at least two different game features is associated with a second, different average expected value, (b) causing at least one processor to execute a plurality of instructions to activate each of the selected game features, (c) causing the at least one processor to execute the plurality of instructions to determine, based at least in part on the activated game features, a game outcome, (d) causing at least one display device to display the determined game outcome, (e) causing the at least one processor to execute the plurality of instructions to determine a game award, said determined game award being based at least in part on the determined game outcome, and (f) causing the at least one display device to display the determined game award, wherein a credit balance is increasable based on the determined game award, said credit balance being increasable via an acceptor of a physical item associated with a monetary value, and said credit balance being decreasable via a cashout device.

14. The method of claim 13, which includes:

causing the at least one processor to execute the plurality of instructions to determine a supplemental award, said determination being based at least in part on the activated game features such that regardless of which game features the player selected to activate, an average expected payout for the play of the game is the same per game feature activated, and causing the at least one display device to display the determined supplemental award.

15. The method of claim 13, wherein each of said different game features is associated with a different average expected value.

16. The method of claim 13, wherein the play of the game includes a play of an on-demand bonus game.

17. The method of claim 13, wherein the determined game award is at least one selected from the group of: a quantity of monetary credits, a quantity of non-monetary credits, a quantity of promotional credits, and a quantity of player tracking points.

18. The method of claim 13, which is operated through a data network.

19. The method of claim 18, wherein the data network is an internet.

* * * * *